No. 796,741. PATENTED AUG. 8, 1905.
M. B. LLOYD.
TREE GUARD.
APPLICATION FILED APR. 22, 1901. RENEWED JAN. 11, 1905.
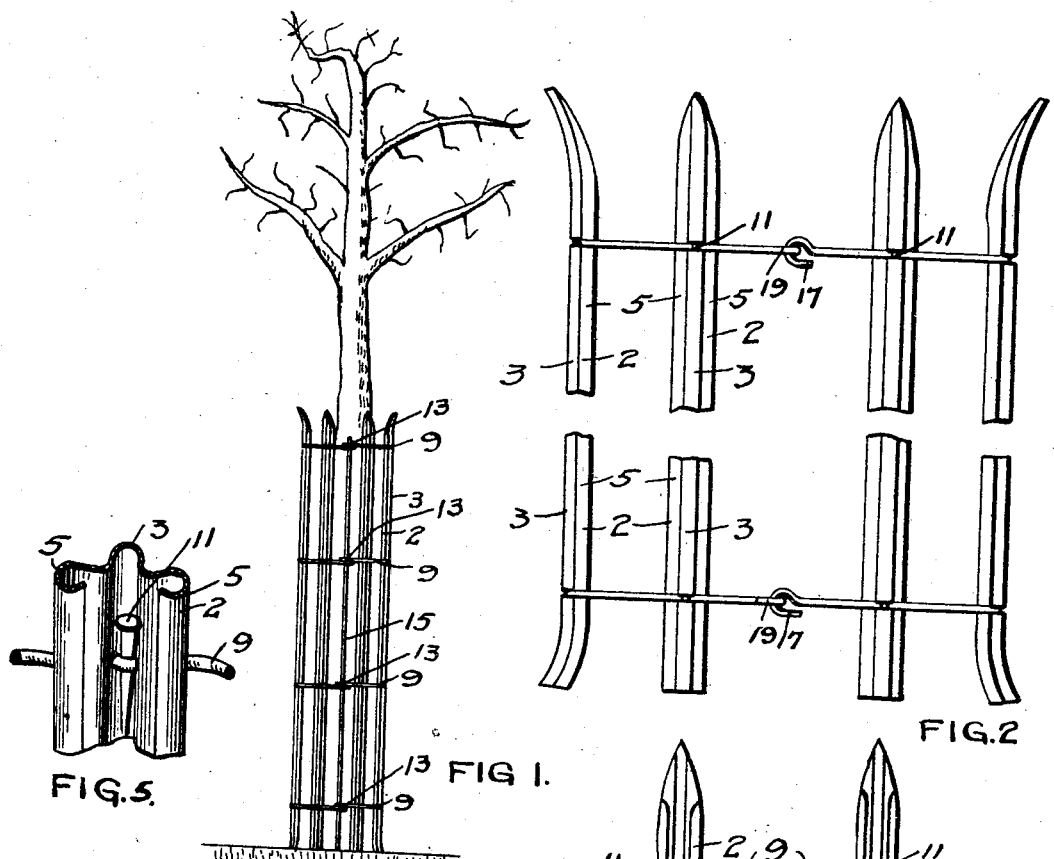
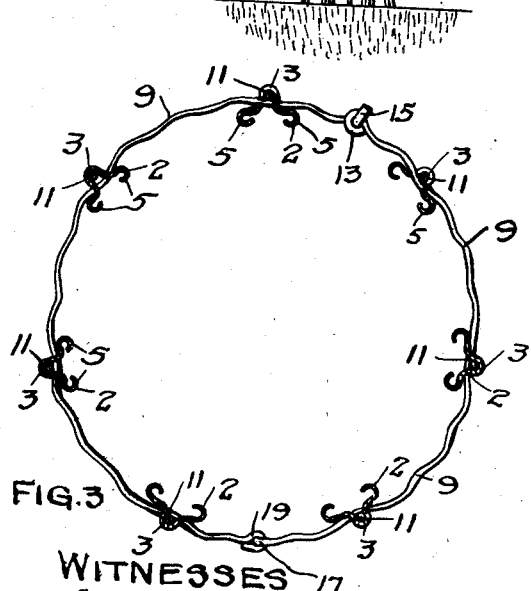
INVENTOR
MARSHALL B. LLOYD
BY Paul H Hawley
HIS ATTORNEYS
WITNESSES
E. G. Stause
M. E. Gooley

UNITED STATES PATENT OFFICE.

MARSHALL B. LLOYD, OF MINNEAPOLIS, MINNESOTA.

TREE-GUARD.

No. 796,741.          Specification of Letters Patent.          Patented Aug. 8, 1905.

Application filed April 22, 1901. Renewed January 11, 1905. Serial No. 240,575.

*To all whom it may concern:*

Be it known that I, MARSHALL B. LLOYD, of Minneapolis, Hennepin county, Minnesota, have invented certain new and useful Improvements in Tree-Guards, of which the following is a specification.

This invention relates to improvements in devices designed for guarding or protecting the trunks of trees; and the objects I have in view are to provide a simple and inexpensive guard that may be quickly applied to any tree and that will fully protect the same.

The invention consists in the novel treatment of construction and combinations of parts hereinafter described, and particularly pointed out in the claims.

In the accompanying drawings, Figure 1 is a side elevation of a tree-guard embodying my invention. Fig. 2 is a similar view of the guard, on an enlarged scale, a portion of the center thereof being broken away. Fig. 3 is a horizontal section of the guard. Fig. 4 is a vertical section showing the back or inner sides of the pickets and the means for fastening the pickets through the wires. Fig. 5 is a detail.

In all of the drawings, 2 represents the metal pickets, which are each provided with the longitudinal central rib 3 and with the longitudinal beads 5 at the edges thereof. The lower end of each picket is curved outwardly and is cut off square across, while the upper end of each picket is pointed and is curved outwardly, and the beads at the edges terminate or vanish at the beginning of the narrow portion of the picket. Each picket is provided with a series of transverse notches extending through the central rib 3, and wires 9, by which the pickets are spaced and held, are placed in these notches and are secured by the nails or pins 11, which are driven between the wire and the inner side of the picket in the rib 3. (See Fig. 5.) The wires 9 are preferably crimped or corrugated, so as to give them a certain amount of elasticity and to give the tree-guard expansibility. Each wire 9 is made in two parts hinged together at 13 by a pintle-rod 15, that passes through loops or eyes in the ends of the wires. The opposite ends of the wires are provided with suitable hooks 17 and eyes 19, by means of which these ends may be fastened together.

The pickets are readily removable and may be at any time changed in their position upon the wires, so that other pickets may be added or a part of the pickets may be removed. The beaded edges of the pickets are toward the body of the tree and prevent injury to the tree in case any one of the pickets should be pushed into contact with the tree-body. The hinged connection in the wires permits of the employment of wires of considerable diameter, such wires being desirable for the purpose of holding the guards in shape. The outturned lower ends of the pickets give the guard a stable position upon the ground, and the outturned upper ends both add to the ornamental appearance of the guard and conform to the usual outline of the tree, so that the guard may be readily applied to trees whose limbs extend out from the tree-body at a point below the tops of the pickets.

I claim as my invention—

1. The combination with the pickets, each formed with the longitudinal central rib on one face and inturned longitudinal beaded edges at the rear face, the central rib being formed with openings, of the wire strands connecting the pickets and passing through the openings formed in the central ribs, said wires being in sections and formed with eyes at their ends between the pickets, pintles passed through said eyes to hinge the sections together, and fastening-pins inserted between the wire strands and the central longitudinal ribs and lying within the central ribs, substantially as described.

2. The combination with the pickets each formed with the longitudinal central rib on one face and inturned longitudinal beaded edges at the rear face, the central rib being formed with openings and the lower ends of the pickets being curved downwardly and outwardly to form an extended bearing-base, of the wire strands connecting the pickets and passing through the openings formed in the central ribs, and the fastening-pins inserted between the wire strands and the central longitudinal ribs and lying within said ribs, substantially as described.

In testimony whereof I have hereunto set my hand, this 18th day of April, 1901, at Minneapolis, Minnesota.

MARSHALL B. LLOYD.

In presence of—
   A. C. PAUL,
   M. E. GOOLEY.